(No Model.)

J. W. MIXTER.
SAW SWAGE.

No. 406,227. Patented July 2, 1889.

WITNESSES:
Phil. C. Dietrich.
C. Sedgwick.

INVENTOR
J. W. Mixter
BY Munn & Co.
ATTORNEY

UNITED STATES PATENT OFFICE.

JASON W. MIXTER, OF PLYMOUTH, MASSACHUSETTS.

SAW-SWAGE.

SPECIFICATION forming part of Letters Patent No. 406,227, dated July 2, 1889.

Application filed March 20, 1889. Serial No. 303,961. (No model.)

*To all whom it may concern:*

Be it known that I, JASON W. MIXTER, of Plymouth, in the county of Plymouth and State of Massachusetts, have invented a new and Improved Guide for Saw-Swages, of which the following is a full, clear, and exact description.

My invention relates to an improvement in saw-swages, and has for its object to provide guides therefor whereby the operator will be enabled to hold the swage perfectly true and even in an exact straight line with the saw and bring the center of the crowning-die in the center of the saw-tooth, and also provides against wearing or breaking the outer points of the saw-teeth by preventing them coming in contact with the band while the teeth are being swaged. A further object of the invention is to provide guides capable of adjustment for use with thick or with thin teeth, and also to provide a means for effectually retaining the band in contact with the dies.

The invention consists in the novel construction and combination of the several parts, as will be hereinafter more fully set forth, and pointed out in the claims.

Reference is to be had to the accompanying drawings, forming a part of this specification, in which similar figures of reference indicate corresponding parts in all the views.

Figure 1:
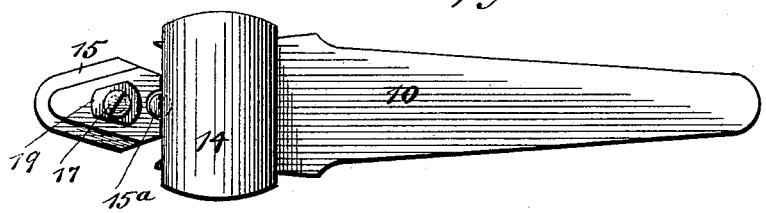
Figure 2:
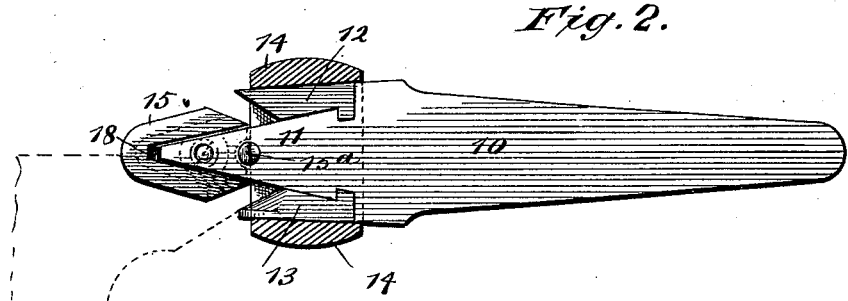
Figure 3:
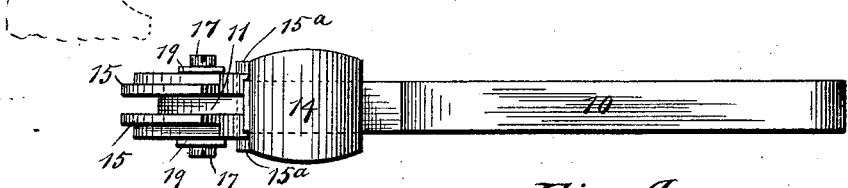
Figure 4:
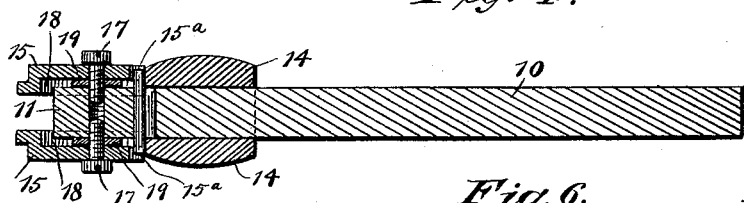
Figures 5, 6, 7, 8, 9:
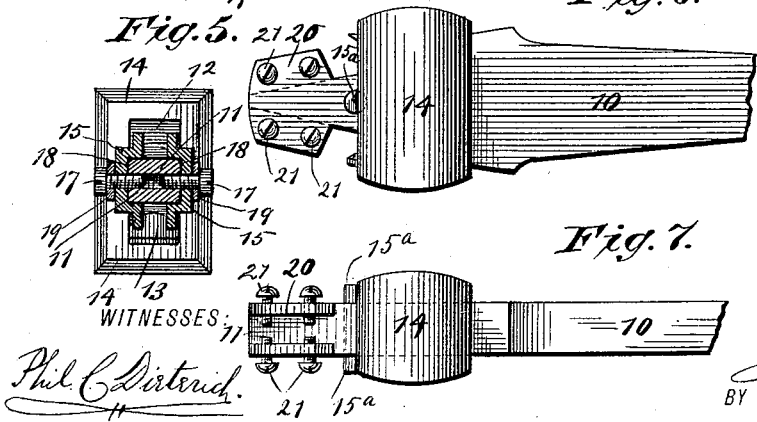

Figure 1 is a side elevation of a saw-swage having my improvement applied. Fig. 2 is a central vertical section through the band, one of the guides being detached from the device. Fig. 3 is a plan view. Fig. 4 is a horizontal section. Fig. 5 is a vertical transverse section taken through the tongue and guides. Fig. 6 is a partial side elevation illustrating the application of a slightly-modified form of guide. Fig. 7 is a plan view of Fig. 6, and Figs. 8 and 9 are detail views of different forms of guides detached from the swage.

In carrying out the invention one end of the body 10 is provided with a triangular tongue 11, having recesses in the opposite sides to receive the usual flat and convex or crowning dies 12 and 13, which dies are held in rigid contact with the tongue by a metal band 14. As the band sometimes spreads, permitting the dies to move, and thereby interfere with the proper swaging, I retain the band always in proper position by passing a half-round key $15^a$ through a circular aperture produced in the tongue to a contact with the upper face of the band, the hole being so drilled that a quarter or a third thereof will be covered by the said band. Should the band become loosened, it may be effectually tightened by simply turning the key slightly to either side.

One guide 15 is provided for each side face of the tongue, and the said guides are provided with a recess 18 in the inner face to receive said tongue, as best shown in Figs. 2, 5, and 8. The guides partake, essentially, of the contour of the tongue, and are secured thereto by passing a set-screw 17 through the outer face into the tongue, as plainly shown in Figs. 4 and 5. In addition to centering the swage upon the saw-teeth, the guides also serve to assist in retaining the band in place, a recess 16 being formed in the lower end of each guide to receive the key $15^a$, whereby the said ends of the guide find a seat upon the outer end of the band, as clearly shown in Figs. 1 and 4.

It will be observed that when the guides are placed in position upon the tongue they project beyond each side and the outer end of the same, thereby practically forming flanges for the tongue. The inner face of the guides extending beyond the tongue may be serrated or otherwise roughened, if in practice it is found advisable.

In order to accommodate the guides to teeth of varying thickness, washers 19 are placed in the grooves 18 of the guides, through which washer a set-screw 17 is passed, as best illustrated in Fig. 4. One or more washers may be employed, as found necessary, and when the said washers are not needed they may be placed temporarily upon the outer face of the guide, being held in engagement therewith by a set-screw, as best illustrated in Figs. 1 and 3. The washers 19 are necessarily made to conform in contour with the grooves 18 of the guides.

In Figs. 6 and 7 I have illustrated a slightly-modified form of guide, consisting of flanges 20, formed integral with the oppositely-inclined faces of the tongue at each side of the same, in which flanges two or more adjusting-screws 21 are introduced, the said screws being adapted to clamp or engage with the sides of the teeth to be swaged, and are equivalent to the washers 19, used in connection with the form of device heretofore described.

In Fig. 9 a further modification is illustrated, consisting of an essentially-triangular guide-plate 22, containing four adjusting-screws 23—two at each side—a central aperture 24, and a base-recess 25. The guide-plate illustrated in Fig. 9 is flat upon both sides, and is attached by bringing one face in contact with the side of the tongue and introducing the set-screw 17 into the aperture 24, whereby the guide is secured to the tongue in a similar manner to the form of guide first described. The adjusting-screws 23, as in the former guide, illustrated in Figs. 6 and 7, are manipulated to reduce the space between the opposed guides for the reception of a tooth of greater or less thickness. The lower outer edges of the form of guide illustrated in Figs. 6 and 8 are preferably beveled, and the guides may be made of any suitable material, such as iron, steel, copper, or brass. If in practice it is found desirable, the inner face of the guides may be formed of copper.

Having thus described my invention, I claim as new and desire to secure by Letters Patent—

1. The combination, with a saw-swage provided with a triangular tongue and a die secured to the base of the tongue at top and bottom, of guides provided with a longitudinal recess upon the inner face capable of receiving the sides of the tongue, and means, substantially as shown and described, for securing the said guides to the said tongue, as and for the purpose specified.

2. The combination, with a saw-swage provided with a tongue projected from one end, a die held in contact with the top and bottom, respectively, of said tongue at the base, and a band clamping said dies to said tongue, of a key consisting of a half-round pin capable of passing through the tongue in contact with the band, substantially as and for the purpose specified.

3. The combination, with a saw-swage provided with a triangular tongue, a die located at the top and bottom of the tongue at the base, a band binding said dies to said tongue, and a key consisting of a half-round pin capable of passing through the tongue in contact with the outer face of the band, of a guide detachably secured to each side of the tongue in advance of the dies, and means, substantially as shown and described, for adjusting the said guides upon the said tongue, as and for the purpose specified.

JASON W. MIXTER.

Witnesses:
J. FRANK CHURCHILL,
ELMER W. HATHAWAY.